(12) United States Patent
Calavin et al.

(10) Patent No.: US 10,557,442 B2
(45) Date of Patent: Feb. 11, 2020

(54) PURGE EJECTOR ASSEMBLY FOR AN ENGINE

(71) Applicant: Ningbo Geely Automobile Research & Development Co., Ltd., Ningbo (CN)

(72) Inventors: Björn Calavin, Göteborg (SE); Erik Fredholm, Billdal (SE)

(73) Assignee: NINGBO GEELY AUTOMOBILE RESEARCH & DEVELOPMENT CO., LTD, Ningbo (CN)

( * ) Notice: Subject to any disclaimer, the term of this patent is extended or adjusted under 35 U.S.C. 154(b) by 0 days.

(21) Appl. No.: 16/445,148

(22) Filed: Jun. 18, 2019

(65) Prior Publication Data

US 2019/0301402 A1 Oct. 3, 2019

Related U.S. Application Data

(63) Continuation of application No. PCT/CN2017/113887, filed on Nov. 30, 2017.

(30) Foreign Application Priority Data

Dec. 22, 2016 (EP) .................................. 16206484

(51) Int. Cl.
*F02M 25/08* (2006.01)
*F02M 37/00* (2006.01)
(Continued)

(52) U.S. Cl.
CPC ......... *F02M 25/089* (2013.01); *F02B 37/164* (2013.01); *F02D 41/004* (2013.01);
(Continued)

(58) Field of Classification Search
CPC ............. F02M 25/089; F02M 25/0836; F02M 37/0076
(Continued)

(56) References Cited

U.S. PATENT DOCUMENTS 5,291,916 A 3/1994 Kloosterman
6,220,271 B1 4/2001 Emmerich
(Continued)

FOREIGN PATENT DOCUMENTS

CN 102192051 A 9/2011
CN 104033291 A 9/2014
(Continued)

OTHER PUBLICATIONS

International Search Report and Written Opinion from corresponding International Patent Application No. PCT/CN2017/113887, dated Feb. 8, 2018, 6 pages.
(Continued)

*Primary Examiner* — Hai H Huynh
*Assistant Examiner* — Gonzalo Laguarda
(74) *Attorney, Agent, or Firm* — Tucker Ellis LLP

(57) ABSTRACT

A purge ejector assembly for an engine has a first fluid passage with a nozzle device therein that raises flow velocity of air and a first valve therein between an engine manifold port and the nozzle and permitting flow from the engine manifold port toward the nozzle device while restricting reverse flow. A second fluid passage has a second valve therein between the engine manifold port and a purge flow port, and permitting flow from the purge flow port toward the engine manifold port while restricting reverse flow. A third fluid passage extends from a second passage position located between the purge flow port and the second valve to a first passage position located between the nozzle device and an air inlet channel port. A third valve in the third passage permits flow from the purge flow port toward the air inlet channel port, while restricting reverse flow.

15 Claims, 6 Drawing Sheets

(51) Int. Cl.
   *F02D 41/00* (2006.01)
   *F02M 35/10* (2006.01)
   *F02B 37/16* (2006.01)
(52) U.S. Cl.
   CPC ..... *F02D 41/0032* (2013.01); *F02M 25/0836* (2013.01); *F02M 25/0872* (2013.01); *F02M 35/10222* (2013.01); *F02M 37/0076* (2013.01); *Y02T 10/144* (2013.01)
(58) Field of Classification Search
   USPC .............................. 123/516, 518–520, 559.1
   See application file for complete search history.

(56) References Cited

U.S. PATENT DOCUMENTS

| | | | |
|---|---|---|---|
| 8,924,133 B2 | 12/2014 | Hadre | |
| 8,925,520 B2* | 1/2015 | Pursifull | F02D 31/005 123/339.23 |
| 9,574,507 B2* | 2/2017 | Pursifull | F02D 41/0032 |
| 9,874,137 B2* | 1/2018 | Pursifull | F02M 25/0836 |
| 10,288,021 B2* | 5/2019 | Luehrsen | F02M 35/10229 |
| 2005/0274368 A1 | 12/2005 | Itakura | |
| 2006/0016477 A1 | 1/2006 | Zaparackas | |
| 2007/0295303 A1* | 12/2007 | Hirooka | B60T 17/02 123/339.23 |
| 2008/0264059 A1* | 10/2008 | Hirooka | B60T 13/52 60/547.1 |
| 2008/0267789 A1* | 10/2008 | Hirooka | B60T 17/02 417/187 |
| 2009/0043477 A1* | 2/2009 | Oi | F02D 9/02 701/103 |
| 2011/0132331 A1 | 7/2011 | Pursifull | |
| 2011/0247594 A1 | 10/2011 | Pursifull | |
| 2012/0016566 A1* | 1/2012 | Cunningham | F02D 37/02 701/103 |
| 2013/0233276 A1* | 9/2013 | Pursifull | F02D 9/02 123/337 |
| 2013/0269660 A1* | 10/2013 | Peters | F02M 25/08 123/520 |
| 2014/0251284 A1* | 9/2014 | Plymale | F02M 25/089 123/518 |
| 2014/0318514 A1 | 10/2014 | Pursifull | |
| 2015/0096541 A1 | 4/2015 | Edmund | |
| 2015/0369184 A1 | 12/2015 | Bucknell | |
| 2016/0069304 A1 | 3/2016 | Guidi | |
| 2016/0153472 A1 | 6/2016 | Fletcher | |
| 2016/0222890 A1* | 8/2016 | Luehrsen | F02M 35/10386 |
| 2016/0341155 A1* | 11/2016 | Dudar | F02M 25/0836 |
| 2016/0368373 A1* | 12/2016 | Dudar | B60K 15/077 |
| 2019/0040823 A1* | 2/2019 | Pursifull | F02D 31/005 |

FOREIGN PATENT DOCUMENTS

| | | |
|---|---|---|
| CN | 104121087 A | 10/2014 |
| DE | 102009024697 A1 | 12/2010 |
| DE | 102011086938 A1 | 5/2013 |
| WO | 2015191540 A1 | 12/2015 |
| WO | 2017/215824 A1 | 12/2017 |

OTHER PUBLICATIONS

International Preliminary Report on Patentability from corresponding International Patent Application No. PCT/CN2017/113887, dated Nov. 26, 2018, 16 pages.
Communication Pursuant to Article 94(3) EPC from corresponding European Patent Application No. 16 206 484.4, dated Feb. 18, 2019, 5 pages.
Extended European Search Report for corresponding European Application No. 16206484.4, dated Mar. 7, 2017, 10 Pages.

* cited by examiner

PURGE EJECTOR ASSEMBLY FOR AN ENGINE

TECHNICAL FIELD

The invention relates to a purge ejector assembly for an engine. The invention also relates to an evaporation fuel purge system comprising a purge ejector assembly. The invention is typically implemented in a vehicle fuel system or in a vehicle engine system. Moreover, the invention relates to a vehicle comprising an evaporation fuel purge system using a purge ejector assembly.

Although the invention will be described in relation to a car, the invention is not restricted to this particular vehicle, but may as well be installed in other type of vehicles such as minivans, recreational vehicles, off-road vehicles, heavy-duty vehicles, such as trucks, buses and construction equipment.

BACKGROUND ART

Vehicle engines, in particular petrol fuel-powered combustion engines but also other engines known in the art, are typically coupled to a fuel system including the fuel tank and other components configured to provide fuel to the engine or the engine system. A majority of these systems also include a so called evaporation fuel purge (EVAP) system for preventing fuel vapours in the fuel tank from escaping into the atmosphere. In this context, it should be noted that a fuel system is typically not allowed to leak more fuel evaporative in the atmosphere than legislation permits. In general, the EVAP system is configured to trap fuel vapours from the fuel tank and temporarily stores them in a charcoal canister. When the vehicle engine is running under certain conditions, the fuel vapours are purged from the canister and burned inside the engine. The canister needs to be drained of hydro carbons to make sure that emissions are still kept to satisfied level. In order to determine when the canister should be emptied, the EVAP system may also include a purge valve or any other control mechanism adapted to control the amount of fuel vapour intended to be purged from the charcoal canister. In many vehicles such as modern cars, the purge valve is controlled by the engine computer. When the engine is off, the purge valve is closed. When the engine is running and fully warmed up, the engine computer gradually opens the purge valve to permit some amount of fuel vapour to be transferred from the charcoal canister to be burned in the engine.

In addition, some system may also include a purge ejector to further improve the process of emptying the canister in an effective manner. A purge ejector can be designed in several different manners. By way of example, the purge ejector typically includes a nozzle to raise the flow velocity of the air flowing through the fluid passages between the canister and the engine system and one or several check valves to control the flow of fuel vapour between the components making up the EVAP system and the engine system.

However, current regulatory conditions in the automotive market have led to an increasing demand to improve the process of purging fuel vapour from the canister to the engine in present vehicles. Further, with increased attention to environmental problems, fuel vapour regulations are becoming more and more stringent. These regulatory conditions must be balanced with the demands on the engine system for high performance for a vehicle. These problems and demands are particularly apparent for engine system using a compressor such as a turbo charger.

In addition, there are several different solutions to arrange the purge ejector in the fluid passage between the canister and the engine system, which partly depends on the design of the engine system and the EVAP system.

It would be beneficial if it could be ensured that the purge ejector or the purge ejector assembly for an engine can be installed in a known or commercially-available vehicle without substantial changes to the fuel system or the EVAP system, while enabling an effective purge of the canister during operation of the engine system.

SUMMARY OF THE INVENTION

A general object of the present invention is to provide an improved purge ejector assembly for an engine. In particular, an object of the present invention is to provide a purge ejector assembly for an engine capable of controlling the process of emptying a canister of a vehicle fuel system during various engine conditions, i.e. during idle at the driving cycles as well as during boost pressure at the driving cycles.

This and other objects, which will become apparent in the following, are accomplished by a purge ejector assembly for an engine as defined in the accompanying independent claim. Details of some example embodiments and further optional features are recited in the associated dependent claims. Thus, according to a first aspect of the present invention, there is provided a purge ejector assembly for an engine. The purge ejector assembly comprises:

- a first fluid passage defining a fluid connection between an engine manifold port and air inlet channel port;
- a nozzle device disposed in the first fluid passage and configured to raise the flow velocity of the air flowing in the first fluid passage;
- a first valve disposed in the first fluid passage at a position in-between the engine manifold port and the nozzle device, the first valve being configured to permit fluid to flow through the first valve from the engine manifold port toward the nozzle device, while restricting fluid to flow through the first valve from the nozzle device toward the engine manifold port;
- a second fluid passage defining a fluid connection between a purge flow port connectable to a canister purge passage and the engine manifold port;
- a second valve disposed in the second fluid passage at a position in-between the engine manifold port and the purge flow port, the second valve being configured to permit fluid to flow through the second valve from the purge flow port toward the engine manifold port, while restricting fluid to flow through the second valve from the engine manifold port toward the purge flow port, thereby enabling evaporated fuel to flow in the second fluid passage from the canister purge passage to the engine manifold port when the purge ejector assembly is subjected to a negative pressure via the engine manifold port;
- a third fluid passage defining a fluid connection between the purge flow port and the air inlet channel port, and extending from a second fluid passage position located between the purge flow port and the second valve to a first fluid passage position located between the nozzle device and the air inlet channel port;
- a third valve disposed in the third fluid passage and configured to permit fluid to flow through the third valve from the purge flow port toward the air inlet channel port, while restricting fluid to flow through the third valve from the air inlet channel port toward the purge flow port, thereby enabling evaporated fuel to flow in the third fluid passage from the canister purge passage to the air inlet channel port when the assembly is subjected to a positive pressure via the engine manifold port forming a negative pressure in the third fluid passage.

By providing a purge injector assembly including a configuration as mentioned above, it becomes possible to improve existing operations of the fuel system. In particular, the present invention provides a purge ejector assembly capable of controlling the purge flow both when the engine is operated under negative pressure (sometimes called vacuum pressure) and under a positive pressure (sometimes also called boost pressure). In this manner, the purge ejector assembly is capable of controlling the process of emptying the canister of a vehicle fuel system during various engine conditions, i.e. during idle at the driving cycles as well as during boost pressure at the driving cycles. This may be particularly important for vehicles with small engine displacement and so called stop/start functions as well as for vehicles including hybrid engines. The above example advantages are also believed to further contribute to better meet prevailing regulations with regards to exhaust and fuel emissions. As such, the example embodiments of the present invention are capable of improving the general performance of the purge ejector assembly.

Furthermore, the arrangements and locations of the first valve, the second valve and the third valve as mentioned above allows for determining and controlling the purge flow in both vacuum pressure (negative pressure) and boost pressure (positive pressure).

Moreover, the arrangement and location of the first valve as mentioned above contributes to provide an undisturbed flow in the first fluid passage, in particular between the nozzle device and the air inlet channel port, thereby further improving the performance of the purge ejector assembly.

In other words, by the principle of the present invention, it becomes possible to provide a purge ejector assembly contributing to empty the canister in an efficient manner, while fulfilling regulations as to exhaust and fuel emissions in a more satisfied manner.

Typically, the second fluid passage defining the fluid connection between the purge flow port and the engine manifold port is connected to the engine manifold port via the first fluid passage. That is, the second fluid passage is connected to the first fluid passage. By way of example, the second fluid passage is connected to the first fluid passage at a junction located between the first check valve and the engine manifold port. However, in some examples, the second fluid passage defining the fluid connection between the purge flow port and the engine manifold port may be directly and independently connected to the engine manifold.

With regards to the third fluid passage, it is to be noted that the third fluid passage extends between the first fluid passage and the second fluid passage, as mentioned above. By way of example, the third fluid passage defining the fluid connection between the purge flow port and the air inlet channel port is connected to the purge flow port via the second fluid passage and connected to the air inlet channel port via the first fluid passage. That is, the third fluid passage is connected to the first fluid passage and the second fluid passage. Further, the third fluid passage is connected to the second fluid passage at a junction located between the purge flow port and the second valve, corresponding to the second fluid passage position, and connected to the first fluid passage at a junction between the nozzle device and the air inlet channel port, corresponding to the first fluid passage position.

In one example embodiment, the nozzle device has a tip end extending toward the air inlet channel port to define a choke passage relative to the air flowing through the nozzle device. By way of example, the first valve is disposed in the first flow path at distance from the nozzle device.

In one example embodiment, each one of the second valve and the third valve comprises a housing and a displaceable member swingable connected to the housing forming a swingable connection permitting the displaceable member to set the valve into an open position and a closed position. Moreover, the swingable connection of the second valve and the swingable connection of the third valve are typically opposite arranged along a line P being perpendicular to the length direction, and a first length distance, as defined by the distance between the swingable connection of said second valve and the line P, being substantially equal to a second length distance, as defined by the distance between the swingable connection of the third valve and the line P.

Typically, although not strictly required, the swingable connection of the second valve and the swingable connection of the third valve are symmetrical arranged along the line P being perpendicular to the length direction L.

In this manner, the design freedom of the EVAP system and the fuel system is improved. The configuration of the components making up the purge ejector assembly also simplifies the mounting of the assembly to the system, thus reducing the risk of having an erroneous mounting of the assembly to the system.

According to one example embodiment, the purge ejector assembly is a single unit.

According to one example embodiment, the purge ejector assembly is an assembled single unit. By way of example, the assembled single unit is formed by a first part, a second part and a third part being interconnected to each other via the first valve, the second valve and the third valve.

According to one example embodiment, the first part is interconnected to the second part via the third valve, the first part is also interconnected to the third part via the second valve, the second part is interconnected to the first part via the third valve, the second part is interconnected to the third part via the first valve, the third part is interconnected to the first part via the second valve, and the third part is interconnected to the second part via the first valve. This configuration enables a compact and robust design of the purge ejector assembly.

Typically, although strictly not required, any one of the valves is a check valve, non-return valve, one-way valve or the like. Check valves are so called two-port valves, i.e. the valves are provided with two openings in the body, one for fluid to enter and the other for fluid to leave. Although they are available in a wide range of sizes and costs, check valves generally are very small, simple, or inexpensive. Check valves generally work automatically and are configured to allow fluid to flow through the valve in only one direction. The bodies (external shells) of most check valves are made of plastic or metal. By way of example, the check valve can be any one of a ball check valve, a diaphragm check valve, a swing check valve, a stop check valve, a lift check valve, a pneumatic check valve or the like.

According to one example embodiment, any one or any two or each of the first, second and third valves is configured to work automatically. This means that the operation of the valve is not controlled by an operator or an electronic controller. Thereby, the total cost for the purge ejector assembly can be kept low.

According to one example embodiment, the first valve, and in particular each of the first, second and third valves, is a non-controllable valve that can only close the flow path in one flow direction through the valve. This means essentially that operation and functionality of the valve(s) is autonomous and not controllable by an operator or an microcontroller, or the like, and that the valve(s) is configured such that it cannot close the flow through the valve in both directions. This configuration ensures a low-cost and easily implemented evaporation fuel purge (EVAP) system that is operating at all times when the purge valve is opened for ensuring minimal amount of fuel vapours in the fuel tank from escaping into the atmosphere.

The invention also relates to an evaporation fuel purge system having a purge ejector assembly according to any one of the example embodiments above. In particular, the evaporation fuel purge system comprises a fuel tank for storing fuel, a canister for absorbing evaporation fuel emitted from the fuel tank and adapted to desorb the evaporation fuel. The canister is typically connected to the fuel tank via an evaporative vent passage. Moreover, the evaporation fuel purge system comprises a canister purge passage extending from the canister to an engine manifold and a purge valve disposed in the purge passage and configured to regulate the flow of evaporated fuel in the purge passage. Further, the evaporation fuel purge system comprises a purge ejector assembly according to any one of the example embodiments mentioned above with respect to the purge ejector assembly. Typically, although strictly not required, the purge ejector assembly is disposed at a position in the purge passage between the purge valve and the engine manifold.

The invention also relates to an evaporation fuel purge system, in which the purge ejector assembly is located between an air inlet passage and an air outlet passage in the flowing direction of the intake air. in other words, the evaporation fuel purge system comprises a fuel tank for storing fuel, a canister for absorbing evaporation fuel emitted from the fuel tank and adapted to desorb the evaporation fuel, the canister being connected to the fuel tank via an evaporative vent passage, a canister purge passage extending from the canister to an engine manifold and a purge valve disposed in the purge passage and configured to regulate the flow of evaporated fuel in the purge passage. Moreover, the EVAP system comprises a purge ejector assembly according to any one of the example embodiments mentioned above with respect to the purge ejector assembly, the purge ejector assembly being located between an air inlet passage and an air outlet passage in the flowing direction of the intake air.

The invention also relates to an engine arrangement comprising an engine, an air inlet channel, an air intake unit, and a purge ejector assembly according to any one of the example embodiments above, wherein the purge ejector assembly is mounted directly to a wall of the air inlet channel or directly to a wall of the air intake unit, or wherein the purge ejector assembly is partly or completely integrally formed with the air inlet channel or air intake unit. Mounting of the purge ejector assembly directly to a wall of the air inlet channel or the air intake unit provides reduced pressure fall with the fluid pipe between the nozzle device and the air inlet channel, such that the efficiency of the evaporation fuel purge (EVAP) system can be improved. Moreover, by having the purge ejector assembly being partly or completely integrally formed with the air inlet channel or air intake unit a more compact design is accomplished with less individual and separate parts.

The invention also relates to a vehicle comprising an evaporation fuel purge system and having a purge ejector assembly according to any one of the example embodiments as mentioned above, or to an engine arrangement according to the example embodiment mentioned above.

As used herein, the terms "coupled", "connected" and "operatively connected" typically mean that a component is in operative relation to another component, either directly or indirectly.

The term "fuel" as used herein typically refers to petrol, although the fuel may also refer to diesel or any other fuel for engines such as vehicle engines.

Although the invention will be described in relation to a car, the invention is not restricted to this particular vehicle, but may also be used in other type of vehicles such as trucks, buses, construction equipment, industrial construction machines, wheel loaders, etc.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The various example embodiments of the invention, including its particular features and example advantages, will be readily understood from the following illustrative and non-limiting detailed description and the accompanying drawings, in which.

DETAILED DESCRIPTION OF EXAMPLE EMBODIMENTS OF THE INVENTION

Figure 1:
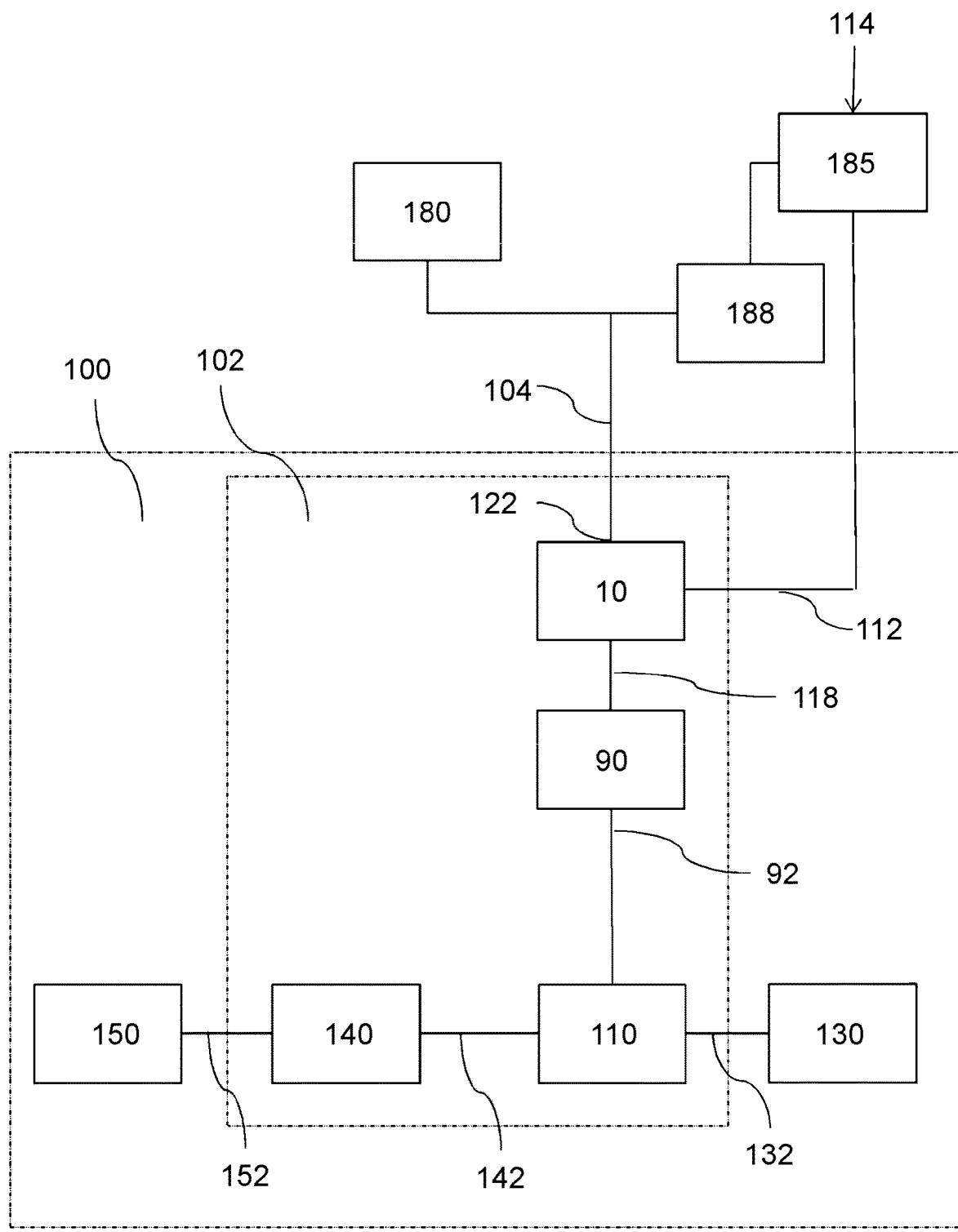
FIG. 1 schematically illustrates an example embodiment of fuel system including a purge ejector assembly according to the present invention, wherein the purge ejector assembly is part of an evaporation fuel purge system.

The present invention will now be described more fully hereinafter with reference to the accompanying drawings, in which exemplary embodiments of the invention are shown.

The invention may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present invention.

Referring now to the figures and FIGS. 1-4 in particular, there is depicted a vehicle evaporation purge system 102 to be installed in a vehicle such as a car. The vehicle evaporation purge system 102 comprises a purge ejector assembly 10 according to various example embodiments, as described hereinafter. In addition, the vehicle evaporation purge system is typically part of a vehicle fuel system 100. Accordingly, the vehicle has a vehicle fuel system 100 comprising the vehicle evaporation purge system 102 being provided with the purge ejector assembly 10 according to the various example embodiments, as described hereinafter. The vehicle (not shown) thus includes the vehicle evaporation purge system 102 provided with the purge ejector assembly 10. The purge ejector assembly 10 is described in further detail below with reference to FIGS. 3-4 and FIGS. 5a-5b. The vehicle (not shown) is in this example a car. It should be readily appreciated that a car is only one example of several different types of vehicles, and it is therefore possible that the invention can be installed and arranged in other vehicles.

Turning now to FIG. 1, there is depicted a vehicle fuel system 100. For ease of reference, the vehicle fuel system may sometimes be denoted as the fuel system 100. Similarly, the vehicle evaporation purge system 102 may sometime be denoted as the evaporation purge system or simply as the EVAP system. The vehicle evaporation purge system 102 is typically, although strictly not necessary, a part of the fuel system. The fuel system 100 is in this example coupled to an engine system 180 (or simple denoted as the engine). That is, the fuel system including the EVAP system is coupled to the engine 180. The engine system includes the engine comprising a plurality of cylinders. Moreover, the engine system has an engine inlet manifold (or simple manifold or intake) and an engine exhaust. Generally, the engine inlet manifold has a throttle fluidly connected to the engine inlet manifold. As shown in FIG. 1, the engine inlet manifold is denoted by reference number 104. It should also be readily appreciated that the engine exhaust typically includes an exhaust manifold connected to an exhaust passage configured to direct exhaust gas to the atmosphere. These components of the engine system as well as their functions and configurations in the engine system are well-known in the art, and therefore not further described herein.

Moreover, as schematically illustrated in FIG. 1, the fuel system is coupled to an air intake unit 185 such as an air filter adapted to receive fresh air from the outside 114. The air intake unit is in this example positioned upstream of the engine inlet manifold 104. In addition, this type of vehicle system also includes a compressor 188 such as a turbocharger, supercharger or the like. The compressor is configured to operate as a boost device. In this example, the compressor 188 is located (or arranged) in-between the engine system 180 and the air intake unit 185. Typically, the compressor 188 is arranged between the throttle located in the engine inlet manifold of the engine system 180 and the air filter corresponding to the air intake unit 185. As is readily known in the art, the compressor 188 is typically configured to draw in intake air at atmospheric air pressure and boost the air to a higher pressure typically corresponding to a positive pressure, sometime also denoted as a boost pressure.

Using the pressurized intake air (i.e. the boosted intake air), a boosted engine operation may be performed by the engine system. The operation of the compressor to obtain a suitable positive pressure may vary depending on type of vehicle and type of engine. In addition, the arrangement, components and functions of the air intake unit 185 and the compressor 188 in view of the engine system 180 may vary depending on type of vehicle, type of engine system and type of fuel system. As these components and their functions are well-known in the art and selected depending on type of vehicle and type system, no further explanation is described herein. In addition, it should be readily appreciated that the above components, arrangement and configurations only relate to one example of several different examples, and it is therefore possible that the invention can be installed and arranged in the vehicle fuel system in other ways.

Turning again to FIG. 1, the fuel system 100 here includes a fuel filter pipe 150 coupled to a fuel tank 140 via a fuel filter pipe passage 152. The fuel tank in this example is adapted to store fuel such as petrol. The fuel tank may include or be coupled to a fuel pump system (not shown) adapted for pressurizing fuel delivered to the engine system, typically to one or a number of fuel injector(s) of the engine system. As mentioned above, the fuel system typically includes the evaporation fuel purge system 102, as illustrated in FIGS. 1 and 2.

Figure 2:
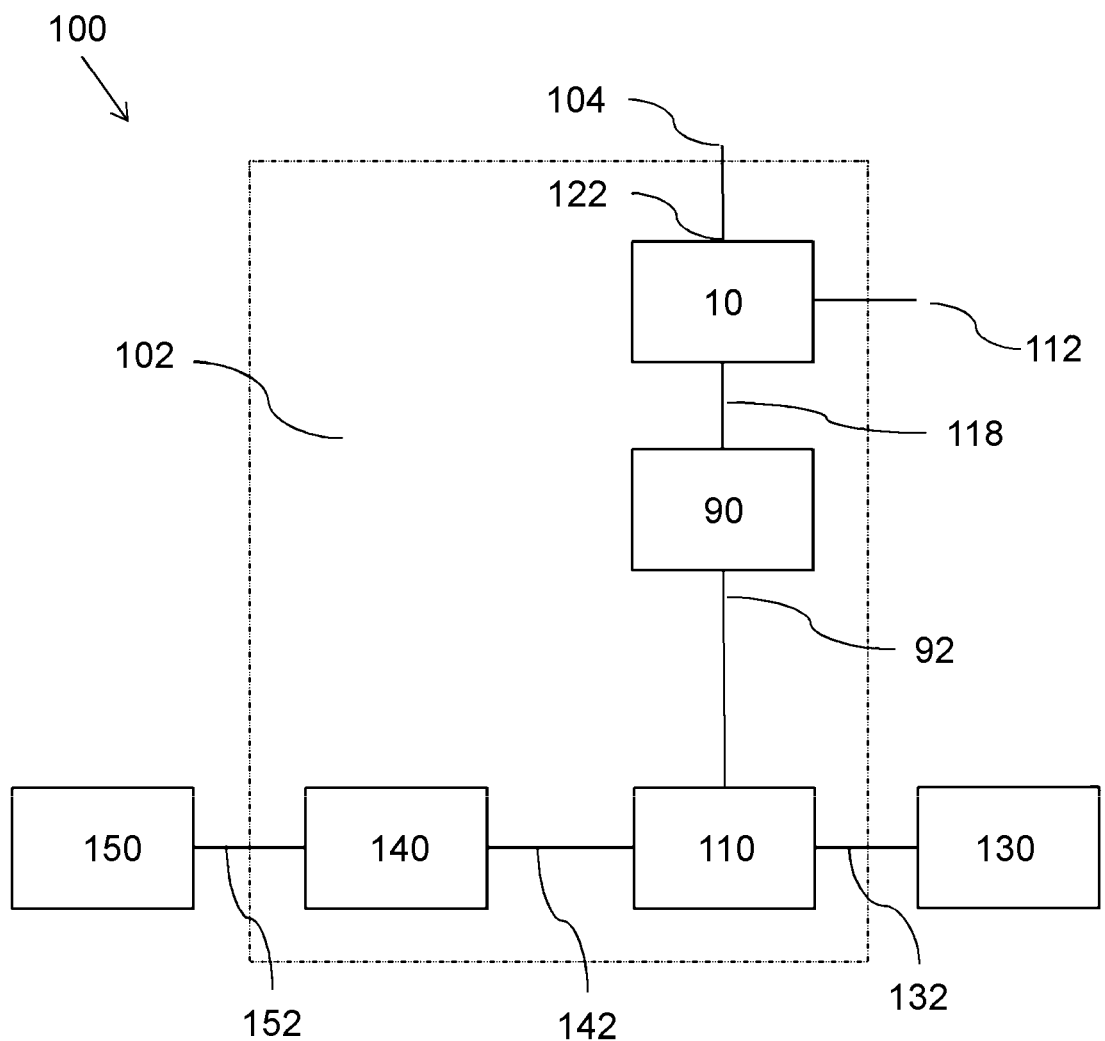
FIG. 2 schematically illustrates an example embodiment of the evaporation fuel purge system in FIG. 1, including a purge ejector assembly according to the present invention.

FIG. 2 depicts an evaporation fuel purge system 102 according to various example embodiments of the invention. In this example, the evaporation fuel purge system 102 comprises the fuel tank 140 for storing fuel. The EVAP also includes a canister 110 for absorbing evaporation fuel emitted from the fuel tank and adapted to desorb the evaporation fuel. In other words, the canister 110 is intended to function as a fuel vapour retaining device. The canister is typically filled with an adsorbent capable of binding large quantities of vaporized HCs. By way of example, the canister includes an adsorbent in the form of activated charcoal.

As shown in FIG. 2, the canister is here connected to the fuel tank 140 via an evaporative vent passage 142. As such, the canister 110 can receive fuel vapours from the fuel tank 140 via the vent passage 142. In some examples, the EVAP system may include one single canister. However, in other examples, the EVAP system can include a number of interconnected canisters. From the above, it should be understood that when fuel is filled into the tank, fuel vapours from the fuel tank can be vented via the vent passage 142 to the canister in order to avoid that hydro carbons are released in the environment.

Turning again to FIGS. 1 and 2, the EVAP system may be connected to an air filter 130 via an air filter ventilation passage 132. For ease of reference the air filter 130 may herein be denoted as the second air filter 130 and the air intake unit 185 including an air filter may be denoted as the first air intake unit or the first air filter 185. The second air filter 130 permits the canister to communicate with atmosphere via the air filter ventilation passage 132. It should be readily appreciated that the canister may be controlled in various ways depending on type of vehicle, type of EVAP system and type of canister. By way of example, the canister may be controlled by one or several canister vent solenoids (not shown), as is well-known in the art.

Figure 3:
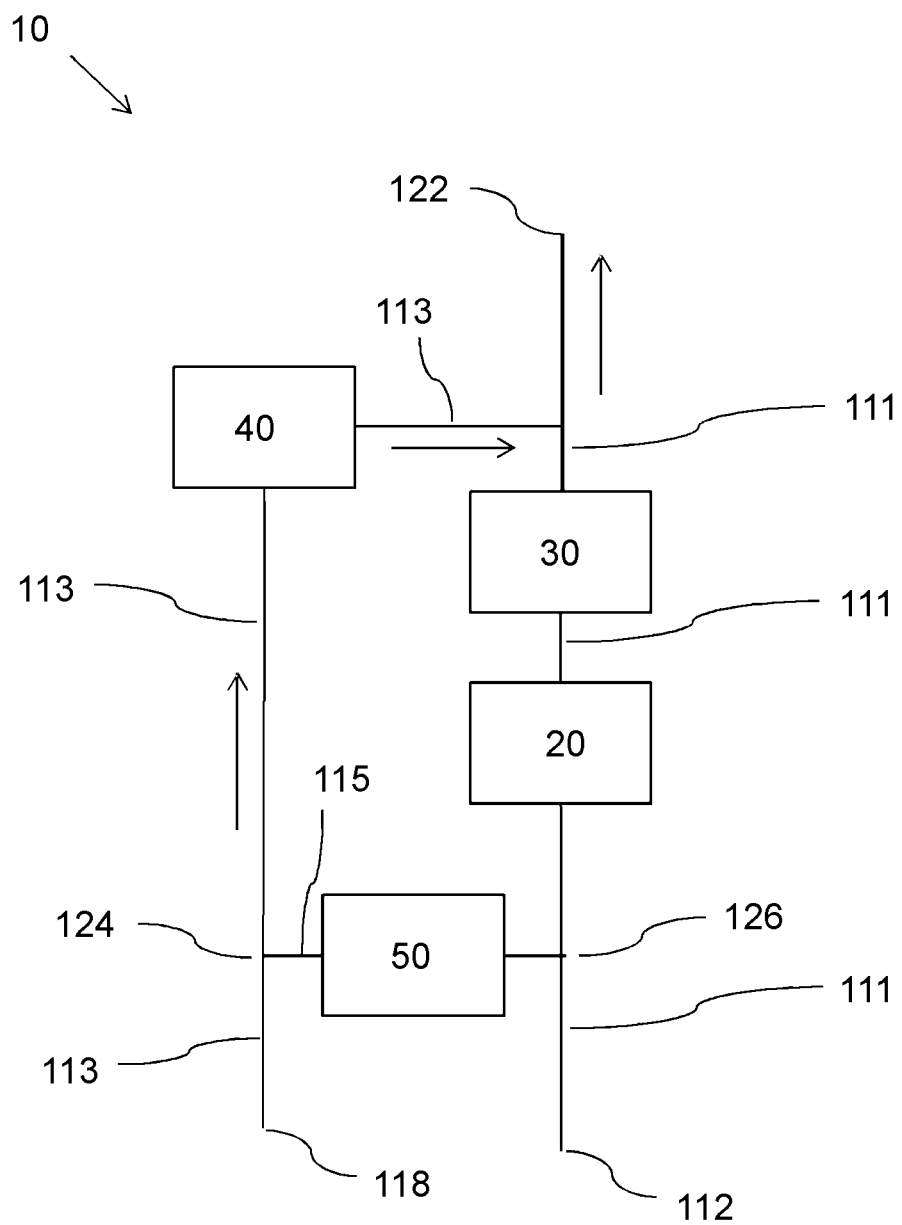
FIG. 3 schematically illustrates a purge ejector assembly according to various example embodiments of the invention, in which the purge ejector assembly is subjected to a negative pressure via an engine manifold port so that the purge ejector assembly is set to operate under a so called vacuum pressure.

Moreover, as illustrated in e.g. FIGS. 2 and 3, a canister purge passage 92 extends from the canister 110 to the engine manifold 104. As will be further described below, the canister needs to be drained of hydro carbons to make sure that emissions are still kept to a satisfied level. Therefore, the EVAP system typically, although strictly not required, comprises a purge valve 90 disposed in the purge passage 92. The purge valve is configured to regulate the flow of evaporated fuel in the purge passage 92. By opening the purge valve, the hydro carbons contained in the canister can be transferred to the engine system and subsequently combusted in the engine. The purge valve 90 may for instance be operated by software and set to open and close on the basis of the duty cycle of a solenoid connected to the purge valve. For instance, the purge valve 90 may be set to a closed state so that no fuel vapours are purged via the purge passage 92. In contrast, when the purge valve is set to an open state, it becomes possible to purge fuel vapours from the canister. By way of example, the purge valve 90 may be a conventional check valve, a solenoid or the like. Further, as mentioned above, the evaporation fuel purge system 102 comprises the purge ejector assembly 10 according to various example embodiments described herein.

In this example, as shown in FIGS. 1 and 2, and also in the following FIGS. 3-5b, the purge ejector assembly 10 is disposed at a position in the purge passage 92 between the purge valve 90 and the engine inlet manifold 104. However, it should be readily appreciated that the purge ejector assembly 10 may be installed in other locations of the EVAP system and/or the purge passage. In other words, the purge passage 92 is coupled to the purge ejector assembly 10, which is then coupled to the engine system 180 via the engine inlet manifold 104. As an example, the purge passage 92 is connected to a purge flow port 118 of the purge ejector assembly 10. That is, the purge flow port 118 is connectable to the canister purge passage 92. Furthermore, the engine inlet manifold is coupled to an engine manifold port 122 of the purge ejector assembly 10. That is, the engine manifold port 122 is connectable to the engine inlet manifold 104. Accordingly, in this example as illustrated by the FIGS. 1-4 as well FIGS. 5a and 5b, the purge ejector assembly is coupled to the engine inlet manifold by the engine manifold port 122 and to the canister 110 and the purge passage 92 by the purge flow port 118.

In addition, the purge ejector assembly 10 comprises an air inlet channel port 112. The air inlet channel port 112 couples the purge ejector assembly 10 to the air inlet channel leading to the air intake unit 185. In addition, as shown in FIG. 1, the air intake unit 185 is typically coupled to the compressor 188. However, this example is only one of many possible examples of a fluid connection between the various components of the system.

Figure 4:
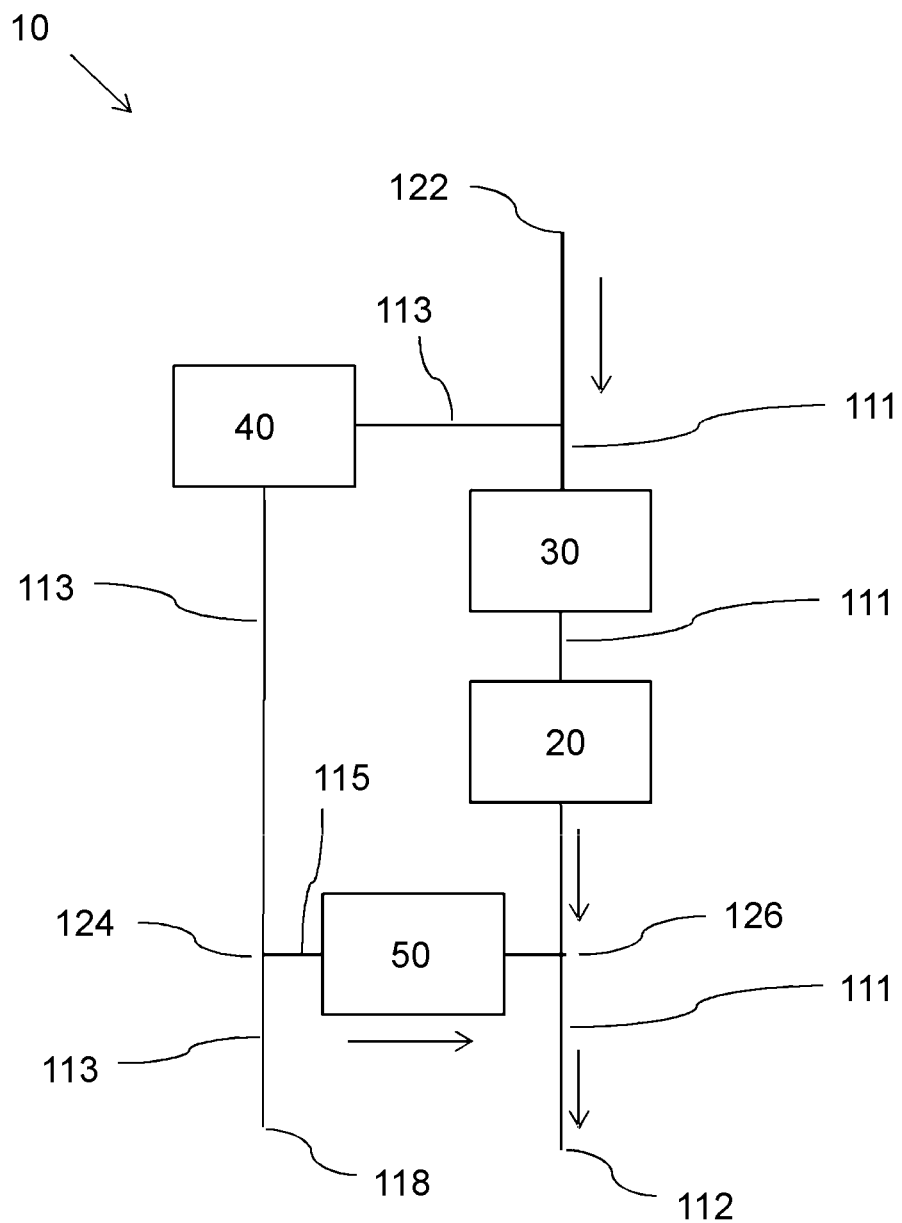
FIG. 4 schematically illustrates a purge ejector assembly according to various example embodiments of the invention, in which the purge ejector assembly is subjected to a positive pressure via an engine manifold port so that the purge ejector assembly is set to operate under a so called boost pressure.

In the following, an example embodiment of the purge ejector assembly 10 intended for the EVAP system 102 is described in conjunction with FIGS. 3 and 4. FIG. 3 schematically illustrates the purge ejector assembly according to an example embodiment, in which the purge ejector assembly is subjected to a negative pressure via the engine manifold port 122 so that the purge ejector assembly is set to operate under a so called vacuum pressure. FIG. 4 schematically illustrates an example embodiment of the purge ejector assembly in FIG. 3, in which the purge ejector assembly is subjected to a positive pressure via the engine manifold port 122 so that the purge ejector assembly is set to operate under a so called boost pressure.

Referring to the FIGS. 3 and 4, the EVAP system 102 in these figures comprises the purge ejector assembly 10 for an engine. In this example, the purge ejector assembly 10 is provided as a single unit, as illustrated in FIGS. 3 and 4. However, the purge ejector assembly may in other examples (although not shown) also be provided as separate components in the EVAP system, thus in combination making up the purge ejector assembly.

Moreover, as illustrated in FIGS. 3 and 4, the purge ejector assembly 10 comprises a first fluid passage 111 defining a fluid connection between the engine manifold port 122 and an air inlet channel port 112. The first fluid passage is adapted to transport fluids, e.g. air and vapour such as fuel vapour between the engine manifold port 122 and the air inlet channel port 112. Unless the fluid passage is restricted by a valve as mentioned below, the fluid passage is capable of transporting fluid in both directions between the engine manifold port 122 and air inlet channel port 112.

The engine manifold port 122 is configured to connect the purge ejector assembly 10 to the engine manifold 104, as mentioned above.

In addition, the purge ejector assembly 10 comprises a nozzle device 20 disposed in the first fluid passage 111. The nozzle device is configured to raise the flow velocity of the air flowing in the first fluid passage 111. Typically, the nozzle device 20 has a tip end extending toward the air inlet channel port 112 to define a choke passage relative to the air flowing through the nozzle device. In other words, the nozzle comprises an orifice configured to converge in a direction from the engine manifold port toward the air inlet channel port. That is, the inside diameter of the nozzle is gradually made smaller toward the tip end. One end of the choke passage is located in the fluid passage 111 so that said end extends toward the engine manifold port 122, and the other tip end of the choke passage is extended toward the air inlet channel port 112. The nozzle device contributes to raise the flow velocity of the air flowing from the engine manifold port 122 to the air inlet channel port 112 when the assembly 10 is subjected to a positive pressure (boost pressure) upon a operation of the compressor (turbocharger). This raise in the flow velocity may be explained by the choke effect provided by the configuration of the nozzle device. In this manner, a negative pressure is generated at the tip end of the nozzle device where high speed air flows, thus leading to a negative pressure at a first fluid passage position 126 located between the nozzle device 20 and the air inlet channel port 112 corresponding to the junction between the first fluid passage 111 and the third fluid passage 115. Hereby, a negative pressure is formed in the third fluid passage 115 upon a positive pressure in the first fluid passage 111, as further described below.

It is to be noted that the distance between the first valve 30 and the nozzle device may vary depending on type of assembly, type of fuel system and type of vehicle. However, in some examples, the first valve 30 is disposed in the first flow path at distance about 20 mm from the nozzle device 20. Typically, the first valve 30 is disposed in the first flow path at a distance about 10-30 mm from the nozzle device 20. However, other distances are conceivable.

Further, as shown in FIGS. 3 and 4, the assembly 10 comprises a first valve 30 disposed in the first fluid passage 111 at a position in-between the engine manifold port 122 and the nozzle device 20. The first valve 30 is configured to permit fluid to flow through the first valve 30 from the engine manifold port 122 toward the nozzle device 20, while restricting fluid to flow through the first valve from the nozzle device 20 toward the engine manifold port 122. In this example embodiment, the first valve is a check valve.

Turning again to FIGS. 3 and 4, the assembly 10 comprises a second fluid passage 113 defining a fluid connection between the purge flow port 118 connectable to the canister purge passage 92 and the engine manifold port 122. As shown in the figures, in this example, the second fluid passage is connected to the engine manifold port at junction in the first fluid passage located between the engine manifold port 122 and the first valve 30. Similar to the situation with the first fluid passage, a second valve 40 is disposed in the second fluid passage 113. The second valve is disposed in the second fluid passage at a position in-between the engine manifold port 122 and the purge flow port 118. Further, the second valve 40 is configured to permit fluid to flow through the second valve 40 from the purge flow port 118 toward the engine manifold port 122, while restricting fluid to flow through the second valve 40 from the engine manifold port 122 toward the purge flow port 118. Hereby, evaporated fuel is permitted to flow in the second fluid passage 113 from the canister purge passage 92 to the engine manifold port 122 when the assembly 10 is subjected to a negative pressure via the engine manifold port 122. By way of example, the second valve 40 is a check valve. Also, it is to be noted that unless the second fluid passage is restricted by the second valve, the second fluid passage is capable of transporting fluid in both directions between the engine manifold port 122 and the purge flow port 118.

Typically, the second fluid passage 113 defining the fluid connection between the purge flow port and the engine manifold port is connected to the engine manifold port via the first fluid passage 111. That is, the second fluid passage 113 is connected to the first fluid passage. By way of example, the second fluid passage is connected to the first fluid passage 111 at a junction located between the first check valve 30 and the engine manifold port. However, in some examples, the second fluid passage defining the fluid connection between the purge flow port and the engine manifold port may be directly and independently connected to the engine manifold.

Moreover, as illustrated in FIGS. 3 and 4, the assembly 10 comprises a third fluid passage 115 defining a fluid connection between the purge flow port 118 and the air inlet channel port 112. The third fluid passage extends from a second fluid passage position 124 located between the purge flow port 118 and the second valve 40 to a first fluid passage position 126 located between the nozzle device 20 and the air inlet channel port 112. In this example, the second fluid passage position 124 is located at junction of the second fluid passage and the third fluid passage. Further, in this example, the first fluid passage position 126 is located at junction of the first fluid passage and the third fluid passage.

Also in this third fluid passage, there is disposed a valve 50 in the passage. In other words, the third valve 50 is disposed in the third fluid passage 115. The third valve 50 is configured to permit fluid to flow through the third valve 50 from the purge flow port 118 toward the air inlet channel port 112, while restricting fluid to flow through the third valve 50 from the air inlet channel port 112 toward the purge flow port 118. Hereby, evaporated fuel is permitted to flow in the third fluid passage 115 from the canister purge passage 92 to the air inlet channel port 112 when the assembly 10 is subjected to a positive pressure via the engine manifold port 122. It should also be readily appreciated that the positive pressure affecting the assembly 10 forms a negative pressure in the third fluid passage 115. In other words, due to the configuration of the assembly, in particular the first valve 30 and the nozzle 20, there is generated a positive pressure, so called boost pressure, from the charger, in the first fluid passage 111 so that the third fluid passage, which extends between the purge flow port 118 and the air inlet channel port 112, is subjected to a negative pressure. This negative pressure in the third fluid passage enables the canister to be emptied via the third fluid passage to the air inlet channel also when the charger is set to a boost mode. In other words, the positive pressure generated in the first fluid passage 111 of the assembly 10 via the engine manifold port 122, and caused by the charger, forms a negative pressure in the third fluid passage 115.

By way of example, the third valve 50 is a check valve. Also, it is to be noted that unless the third fluid passage is restricted by the third valve, the third fluid passage is capable of transporting fluid in both directions between the purge flow port 118 and the air inlet channel port 112.

With regards to the third fluid passage 115, it is to be noted that the third fluid passage 115 extends between the first fluid passage 111 and the second fluid passage 113, as mentioned above. By way of example, the third fluid passage 115 defining the fluid connection between the purge flow port and the air inlet channel port is connected to the purge flow port via the second fluid passage 113 and connected to the air inlet channel port via the first fluid passage 111. That is, the third fluid passage 115 is connected to the first fluid passage 111 and the second fluid passage 113. Further, the third fluid passage 115 is connected to the second fluid passage 113 at a junction located between the purge flow port and the second valve, corresponding to the second fluid passage position 124, and connected to the first fluid passage at a junction between the nozzle device and the air inlet channel port, corresponding to the first fluid passage position 126. It should be readily appreciated that the location of the second fluid passage position 124 in the second fluid passage may also correspond to the purge flow port. Analogously, the location of the first fluid passage position 126 in the first fluid passage may also correspond to the air inlet channel port.

As mentioned above, the nozzle comprises an orifice configured to converge in a direction from the engine manifold port toward the air inlet channel port. Hence, when the compressor operates in the boost mode to generate a positive pressure, which results in that the purge ejector assembly is subjected to the positive pressure, air flows through the first fluid passage 111 in a direction from engine manifold port 122 towards air inlet channel port 112. In other words, air flows through the first valve 30 and through the nozzle device 20 when the compressor operates in the boost mode to generate a positive pressure. Hereby, as explained above, a vacuum pressure (negative pressure) is created in the third fluid passage 115 due to the configuration of the nozzle device. This vacuum pressure (or negative pressure) enables fuel vapour purging during boosted engine conditions via the third fluid passage 115. The flow of air in the first fluid passage 111 during boosted engine conditions is indicated by arrows in FIG. 4; see the arrows along the first fluid passage 11 in FIG. 4. Analogously, the flow of fuel vapour in the third fluid passage 115 during boosted engine conditions is indicated by arrows in FIG. 4; see the arrows along the third fluid passage 115 in FIG. 4.

It should also be noted that no fluid is capable of flowing through the second valve 40 in the second fluid passage 113 during boosted engine conditions (subjecting the purge ejector assembly to a positive pressure) because the second valve is configured to restrict fluid to flow through the second valve 40 from the engine manifold port 122 toward the purge flow port 118.

However, when the purge ejector assembly is subjected to a negative pressure (or so called vacuum pressure), as illustrated in FIG. 3, the second valve is configured to permit fluid to flow through the second valve 40 from the purge flow port 118 toward the engine manifold port 122. Thereby, the canister can be purged via the purge passage and the purge ejector assembly to the engine system during vacuum pressure engine conditions. It will also be readily understood by the above configuration of the first fluid passage 111 and the first valve 30, that fuel vapour is restricted to flow through the first valve 30 in this mode because the first valve 30 is configured to restrict fluid to flow through the valve from the nozzle device 20 toward the engine manifold port 122.

Also, it should be readily understood that the third fluid passage and the third valve are configured to restrict fluid to flow through the third valve 50 from the air inlet channel port 112 toward the purge flow port 118.

From the above description of the example embodiment of the purge ejector assembly, the fuel vapour purge assembly 10 provides the possibility of purging the canister under various conditions, i.e. both during boosted engine conditions and vacuum pressure conditions.

In this manner, it becomes possible to further improve existing operations of the fuel system and the EVAP system. In particular, the present invention provides a purge ejector assembly capable of controlling the purge flow both when the engine is operated under negative pressure (sometimes called vacuum pressure) and under a positive pressure (sometimes also called boost pressure). As such, the example embodiments of the present invention improve the general performance of the purge ejector assembly.

Figure 5A:
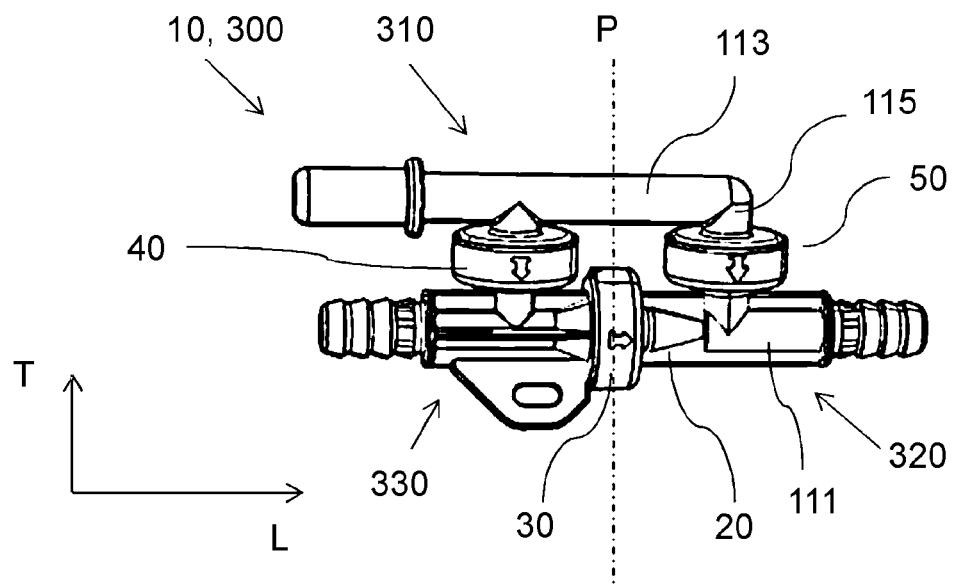
FIGS. 5a and 5b schematically illustrate an example embodiment of a purge ejector assembly according to the present invention.

As mentioned above, the purge ejector assembly may typically be a single purge ejector assembly or an assembled single purge ejector assembly, as illustrated e.g. in the FIG. 5*a*. In this manner, it becomes possible to provide an improved and more compact purge ejector assembly, i.e. the functions of the purge ejector assembly can be arranged within one single unit. FIG. 5*a* illustrates an assembled single unit 300 formed by a first part 310, a second part 320 and a third part 330. The first part 310, the second part 320 and the third part 330 are interconnected to each other via the first valve 30, the second valve 40 and the third valve 50. By way of example, each one of the first valve 30, the second valve 40 and the third valve 50, comprises two halves forming the interconnection between two parts of the pure ejector assembly. In other words, the first part 310 is interconnected to the second part 320 via the third valve 50. The first part 310 is also interconnected to the third part 330 via the second valve 40. Analogously, the second part 320 is interconnected to the first part 310 via the third valve 50. In addition, the second part 320 is interconnected to the third part 330 via the first valve 30. Analogously, the third part 330 is interconnected to the first part 310 via the second valve 40. In addition, the third part 330 is interconnected to the second part 320 via the first valve 30. In this manner, there is provided a purge ejector assembly being easy to assemble, while reducing the risk of erroneous assembly of the components.

Figure 5B:
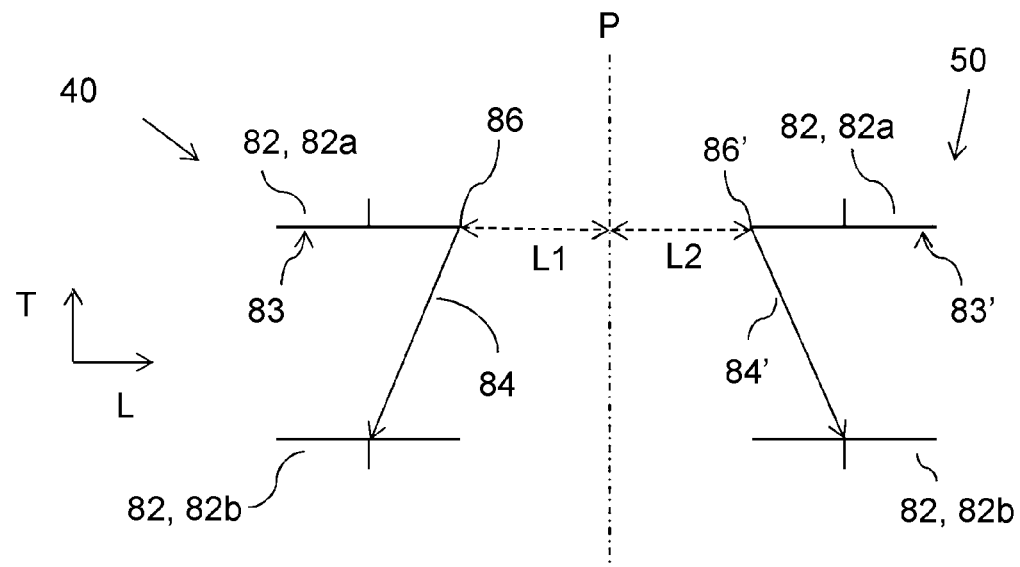

Turning now to FIGS. 5*a* and 5*b*, there is depicted some further details of an example embodiment of the purge ejector assembly intended to be used and installed in the system described in FIGS. 1-4. Thus, in this example embodiment, each one of the second valve 40 and the third valve 50 comprises a housing 82, 82' and a displaceable member 84, 84' swingable connected to the housing forming a swingable connection permitting the displaceable member to set the valve into an open position and closed position. Furthermore, the swingable connection 86 of the second valve 40 and the swingable connection 86' of the third valve 50 are opposite arranged each other in a length direction L. As seen in this figure, the swingable connection 86 of the second valve 40 and the swingable connection 86' of the third valve 50 are arranged along a line P being perpendicular to the length direction L. In addition, a first length distance L1, as defined by the distance between the swingable connection of said second valve and the line P, are substantially equal to a second length distance L2, as defined by the distance between the swingable connection of the third valve and the line P.

Typically, the swingable connection of the second valve and the swingable connection of the third valve are symmetrical arranged along a line P being perpendicular to the length direction L.

An exemplary embodiment of the second valve 40 according to the above is shown in FIGS. 5*a*-5*b*. In this example of the second valve, the valve comprises an outer enclosure 82, 82*a*, 82*b* and a displaceable member 84 pivotably connected to an inner surface 83 of the outer enclosure. The displaceable member is configured to block the flow of fluid. Typically, the displaceable member 84 is hingedly connected to the outer enclosure. By way of example, the outer enclosure 82 of the valve in this example is at least partly defined by first and second parts 82*a* and 82*b* of the purge ejector assembly. The enclosure defines a housing of the check valve. In addition, or alternatively, in some example embodiments, the valve may have an outer enclosure defined by separate components. The outer enclosure of the valve in these examples may comprise a cylindrical shaped outer enclosure. In the illustrated embodiment, a displaceable member 84 is connected to the enclosure of the check valve 40. As shown in FIG. 5*a* the displaceable member 84 is positioned within a chamber 86 of the housing (enclosure) of the check valve 40. When the displaceable member 84 is positioned such that the check valve 40 is open, fluid may enter the chamber of the check valve and pass through the member 84. As shown in FIG. 5*b*, when the displaceable member 84 is positioned such that the check valve 40 is in a closed position, the member 84 can prevent fluid from passing through the valve.

Furthermore, as can be seen from the figures, the second valve 40 comprises the housing 82 and the displaceable member 84 which is swingable connected to the housing 82, thereby forming the swingable connection 86. The swingable connection of the displaceable member is hereby permitted to set the second valve into its open position and closed position.

Analogously, an exemplary embodiment of the third valve 50 according to the above is also shown in FIGS. 5*a*-5*b*. In this example of the third valve, the valve comprises an outer enclosure 82, 82*a*, 82*b* and a displaceable member 84' pivotably connected to an inner surface 83' of the outer enclosure. The displaceable member is configured to block the flow of fluid. Typically, the displaceable member 84' is hingedly connected to the outer enclosure. By way of example, the outer enclosure 82 of the valve in this example is at least partly defined by first and second parts 82*a* and 82*b* of the purge ejector assembly. The enclosure defines a housing of the check valve 50. In addition, or alternatively, in some example embodiments, the valve may have an outer enclosure defined by separate components. The outer enclosure of the valve in these examples may comprise a cylindrical shaped outer enclosure. In the illustrated embodiment, a displaceable member 84' is connected to the enclosure of the check valve 50. As shown in FIG. 5*a* the displaceable member 84' is positioned within a chamber 86' of the housing (enclosure) of the check valve 50. When the displaceable member 84' is positioned such that the check valve 50 is open, fluid may enter the chamber of the check valve and pass through the member 84'. As shown in FIG. 5*b*, when the displaceable member 84' is positioned such that the check valve 50 is in a closed position, the member 84' can prevent fluid from passing through the valve.

Furthermore, as can be seen from the figures, the third valve 50 comprises the housing 82 and the displaceable member 84' which is swingable connected to the housing 82, thereby forming the swingable connection 86'. The swingable connection of the displaceable member is hereby permitted to set the third valve into its open position and closed position.

As shown in the example in FIGS. 1 and 2, the air inlet channel port 112 of the purge ejector assembly 10 is typically coupled to the air inlet channel at a position between the air filter 185 and the compressor 188. However, it should also be readily understood that the purge ejector assembly can be installed in other ways and at other locations in an evaporation fuel purge system.

For example, the purge ejector assembly may be coupled to the air inlet channel at a position downstream of compressor 188 but directly to the air filter, or at least adjacent the air filter.

Thus, in another example embodiment, there is provided an evaporation fuel purge system 102 comprising a fuel tank 140 for storing fuel, a canister 110 for absorbing evaporation fuel emitted from the fuel tank and adapted to desorb the evaporation fuel, the canister being connected to the fuel tank via an evaporative vent passage 142, a canister purge passage 92 extending from the canister 110 to an engine manifold 104 and a purge valve 90 disposed in the purge passage 92 and configured to regulate the flow of evaporated fuel in the purge passage 92. The system 102 further comprises a purge ejector assembly 10 according to any one of the example embodiments as mentioned above and being located between an air inlet passage and an air outlet passage in the flowing direction of the intake air.

As described with reference to FIG. 5*a*, the purge ejector assembly 10 including the first, second and third valves 30, 40, 50 and the nozzle device 20 may be designed as a single unit 300 with three pipe connections acting as air inlet channel port 112, purge flow port 118 and engine manifold port 122. Installation of the purge ejector assembly 10 in the evaporation fuel purge system 102 and to the engine system 180 and air intake unit 185 could then for example be performed via individual and separate fluid pipes 92, 93 that connects the inlet channel port 112 to the air inlet channel 120, the purge flow port 118 with the purge valve 90 and the engine manifold port 122 with the engine manifold 104. This design provides a cost-efficient solution with relatively large flexibility with respect to the physical mounting location of the purge ejector assembly 10.

Figure 6:
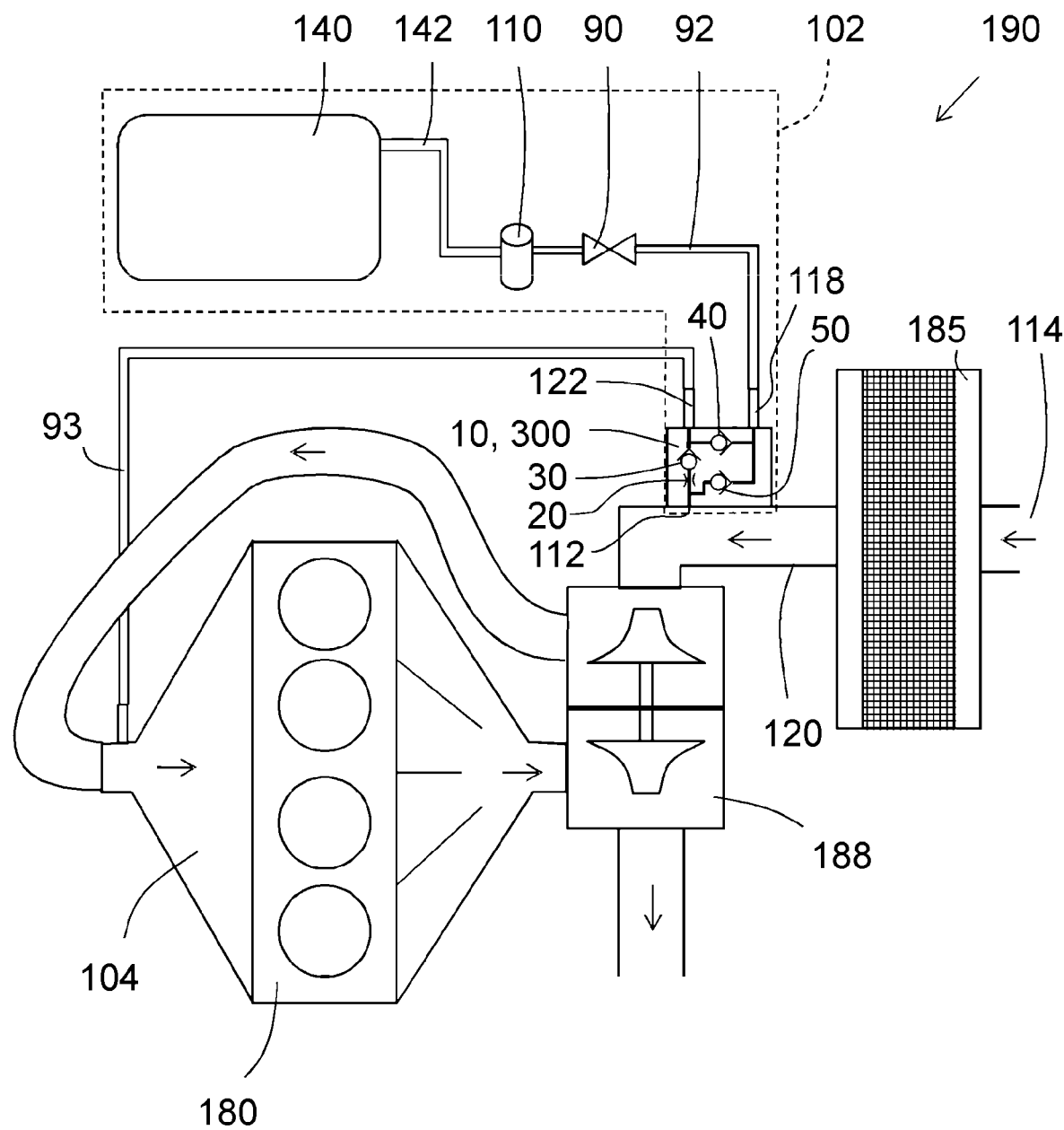
FIG. 6 schematically illustrates an overview of an example embodiment of an engine arrangement comprising a vehicle fuel system coupled to an engine and an air intake unit.

Alternatively, as described below and with reference to FIG. 6 that shows an engine arrangement 190 comprising a vehicle fuel system 102, an engine 180, an air intake unit 185 and a compressor 188, the purge ejector assembly 10 may be designed as a single unit 300 that is mounted directly on or in a wall of the air inlet channel at a position between the air intake unit 185 and the compressor 188, or directly on or in a wall of the air intake unit 185. Thereby, no separate fluid pipe connecting the air inlet channel port 112 of the purge ejector assembly 10 and the air inlet channel 120 is necessary since they are located so close to each other and/or sealed from the surrounding air by means of a housing of the purge ejector assembly 10. This design may result in increased purge efficiency because the pressure drop in the fluid passage between the nozzle device 20 and the air inlet channel 120 is reduced as a result of the shortened length between the nozzle device 20 and the air inlet channel 120.

The single unit purge ejector assembly 10 may for example be fastened directly to the exterior surface of the air inlet channel 120 or air intake unit 185 by means of fasteners, such as screws, or it may be more permanently attached by means of adhesive, welding, or the like.

Still more alternatively, the purge ejector assembly 10, or a housing thereof, may be partly or completely integrally formed with the air inlet channel 120 or air intake unit 185. This means that the purge ejector assembly 10 or the housing thereof is partly or completely manufactured simultaneously with manufacturing of the air inlet channel 120 or air intake unit 185, and thus made in a single piece with air inlet channel 120 or air intake unit 185.

If the purge ejector assembly 10 or its housing is partly integrally formed in the air inlet channel 120 or air intake unit 185, the purge ejector assembly 10 or its housing may for example be composed of two main parts that are joined and fastened to each other to form the complete purge ejector assembly 10, wherein a first main part is integrally formed in the air inlet channel 120 or air intake unit 185 and a second main part is formed separately and subsequently attached to the first main part, for example by means of mechanical fasteners, welding, adhesive, or the like. The first, second and third valves 30, 40, 50 and the nozzle device 20 may then be located in any of said first and second main parts, or distributed between said main parts.

Although the invention has been described in relation to specific combinations of components, it should be readily appreciated that the components may be combined in other configurations as well which is clear for the skilled person when studying the present application. Thus, the above description of the example embodiments of the present invention and the accompanying drawings are to be regarded as a non-limiting example of the invention and the scope of protection is defined by the appended claims. Any reference sign in the claims should not be construed as limiting the scope.

The invention claimed is:

1. A purge ejector assembly for an engine, comprising:
a first fluid passage defining a fluid connection between an engine manifold port and air inlet channel port;
a nozzle device disposed in said first fluid passage and configured to raise the flow velocity of the air flowing in said first fluid passage;
a first valve disposed in said first fluid passage at a position in-between said engine manifold port and said nozzle device, said first valve being configured to permit fluid to flow through said first valve from said engine manifold port toward said nozzle device, while restricting fluid to flow through said first valve from said nozzle device toward said engine manifold port;
a second fluid passage defining a fluid connection between a purge flow port connectable to a canister purge passage and said engine manifold port;
a second valve disposed in said second fluid passage at a position in-between said engine manifold port and said purge flow port, said second valve being configured to permit fluid to flow through said second valve from said purge flow port toward said engine manifold port, while restricting fluid to flow through said second valve from said engine manifold port toward said purge flow port, thereby enabling evaporated fuel to flow in said second fluid passage from said canister purge passage to said engine manifold port when said assembly is subjected to a negative pressure via said engine manifold port;

a third fluid passage defining a fluid connection between said purge flow port and said air inlet channel port, and extending from a second fluid passage position located between said purge flow port and said second valve to a first fluid passage position located between said nozzle device and said air inlet channel port;

a third valve disposed in said third fluid passage and configured to permit fluid to flow through said third valve from said purge flow port toward said air inlet channel port, while restricting fluid to flow through said third valve from said air inlet channel port toward said purge flow port, thereby enabling evaporated fuel to flow in said third fluid passage from said canister purge passage to said air inlet channel port when said assembly is subjected to a positive pressure via said engine manifold port forming a negative pressure in said third fluid passage, wherein the purge ejector assembly is an assembled single unit.

2. Purge ejector assembly according to claim 1, wherein the nozzle device has a tip end extending toward the air inlet channel port to define a choke passage relative to the air flowing through the nozzle device.

3. Purge ejector assembly according to claim 1, wherein each one of the second valve and the third valve comprises a corresponding housing and a corresponding displaceable member swingable connected to said corresponding housing forming a swingable connection permitting said displaceable member to set the valve into an open position and a closed position, wherein said swingable connection of said second valve and said swingable connection of said third valve are opposite arranged along a line being perpendicular to the length direction, and a first length distance, as defined by the distance between the swingable connection of said second valve and the line, being substantially equal to a second length distance, as defined by the distance between the swingable connection of the third valve and the line.

4. Purge ejector assembly according to claim 3, wherein said swingable connection of said second valve and said swingable connection of said third valve are symmetrical arranged along the line being perpendicular to the length direction.

5. Purge ejector assembly according to claim 1, wherein the assembled single unit is formed by a first part, a second part and a third part being interconnected to each other via the first valve, the second valve and the third valve.

6. Purge ejector assembly according to claim 5, wherein
the first part is interconnected to the second part via the third valve
the first part is also interconnected to the third part via the second valve,
the second part is interconnected to the first part via the third valve,
the second part is interconnected to the third part via the first valve,
the third part is interconnected to the first part via the second valve, and
the third part is interconnected to the second part via the first valve.

7. Purge ejector assembly according to claim 1, wherein any one or any two or each of the first, second and third valves is a check valve.

8. Purge ejector assembly according to claim 1, wherein any one or any two or each of the first, second and third valves is configured to work automatically.

9. Purge ejector assembly according to claim 1, wherein the first valve, and in particular each of the first, second and third valves, is a non-controllable valve that can only close the flow path in one flow direction through the valve.

10. An evaporation fuel purge system comprising a fuel tank for storing fuel, a canister for absorbing evaporation fuel emitted from the fuel tank and adapted to desorb the evaporation fuel, said canister being connected to said fuel tank via an evaporative vent passage, a canister purge passage extending from said canister to an engine manifold and a purge valve disposed in said purge passage and configured to regulate the flow of evaporated fuel in said purge passage, wherein said system further comprises a purge ejector assembly according to claim 1, said purge ejector assembly being disposed at a position in said purge passage between said purge valve and said engine manifold.

11. An evaporation fuel purge system comprising a fuel tank for storing fuel, a canister for absorbing evaporation fuel emitted from the fuel tank and adapted to desorb the evaporation fuel, said canister being connected to said fuel tank via an evaporative vent passage, a canister purge passage extending from said canister to an engine manifold and a purge valve disposed in said purge passage and configured to regulate the flow of evaporated fuel in said purge passage, wherein said system further comprises a purge ejector assembly according to claim 1, said purge ejector assembly being located between an air inlet passage and an air outlet passage in the flowing direction of the intake air.

12. An engine arrangement comprising an engine, an air inlet channel, an air intake unit, and a purge ejector assembly according to claim 1,
wherein the purge ejector assembly is mounted directly to a wall of the air inlet channel or directly to a wall of the air intake unit, or
wherein the purge ejector assembly or a housing thereof is partly or completely integrally formed with the air inlet channel or air intake unit.

13. A vehicle comprising an evaporation fuel purge system according to claim 10.

14. A vehicle comprising an evaporation fuel purge system according to claim 11.

15. A vehicle comprising an engine arrangement according to claim 12.

* * * * *